US012781156B2

(12) United States Patent
Jassal et al.

(10) Patent No.: US 12,781,156 B2
(45) Date of Patent: Nov. 3, 2026

(54) CLEANING PRODUCT FOR A CENTRAL HEATING SYSTEM

(71) Applicant: ADEY HOLDINGS (2008) LIMITED, Haresfield (GB)

(72) Inventors: Mukash Jassal, Haresfield (GB); Caitlin Doyle, Haresfield (GB); Josh Beaney, Haresfield (GB)

(73) Assignee: ADEY HOLDINGS (2008) LIMITED, Haresfield (GB)

( * ) Notice: Subject to any disclaimer, the term of this patent is extended or adjusted under 35 U.S.C. 154(b) by 185 days.

(21) Appl. No.: 18/727,186

(22) PCT Filed: Jan. 5, 2023

(86) PCT No.: PCT/GB2023/050012

§ 371 (c)(1),
(2) Date: Jul. 8, 2024

(87) PCT Pub. No.: WO2023/131788

PCT Pub. Date: Jul. 13, 2023

(65) Prior Publication Data

US 2026/0176556 A1 Jun. 25, 2026

(30) Foreign Application Priority Data

Jan. 7, 2022 (GB) ..................................... 2200169

(51) Int. Cl.
*C11D 1/00* (2006.01)
*C11D 1/88* (2006.01)
(Continued)

(52) U.S. Cl.
CPC .................. *C11D 1/88* (2013.01); *C11D 3/28* (2013.01); *C11D 3/30* (2013.01); *C11D 3/361* (2013.01);
(Continued)

(58) Field of Classification Search
CPC .... C11D 1/88; C11D 3/28; C11D 3/30; C11D 3/361; C11D 3/378; C11D 17/043; C11D 17/045; C11D 2111/14
(Continued)

(56) References Cited

U.S. PATENT DOCUMENTS 4,810,405 A * 3/1989 Waller .................... C23G 1/26 422/14
2013/0315972 A1 11/2013 Krasnow et al.
(Continued)

FOREIGN PATENT DOCUMENTS

CN 111663142 A 9/2020
CN 112226772 A 1/2021
(Continued)

OTHER PUBLICATIONS

Written Opinion of the International Searching Authority dated Mar. 28, 2023.

*Primary Examiner* — Eisa B Elhilo
(74) *Attorney, Agent, or Firm* — Jacob M. Ward; Ward Law Office LLC

(57) ABSTRACT

A cleaning product (130) is provided for use in a central heating or cooling system. The cleaning product (130) includes at least 20% complexing agent, at least about 5% dispersing agent, at least about 5% amphoteric surfactant, and less than 20% water, which are mixed together to form a cream or gel. The cleaning product (130) can be encapsulated in a water-soluble film or provided in another container, and may be added to a filter (100) for cleaning a central heating system.

20 Claims, 2 Drawing Sheets

(51) Int. Cl.

| | |
|---|---|
| ***C11D 3/28*** | (2006.01) |
| ***C11D 3/30*** | (2006.01) |
| ***C11D 3/36*** | (2006.01) |
| ***C11D 3/37*** | (2006.01) |
| ***C11D 17/04*** | (2006.01) |

(52) U.S. Cl.
CPC ............ *C11D 3/378* (2013.01); *C11D 17/043* (2013.01); *C11D 17/045* (2013.01); *C11D 2111/14* (2024.01); *C11D 2111/40* (2024.01)

(58) Field of Classification Search
USPC .......................................................... 510/404
See application file for complete search history.

(56) References Cited

U.S. PATENT DOCUMENTS

| | | | | |
|---|---|---|---|---|
| 2018/0127360 | A1 | 5/2018 | Berg et al. | |
| 2021/0230511 | A1* | 7/2021 | Bettiol | C11D 1/12 |
| 2021/0230512 | A1* | 7/2021 | Bettiol | C11D 1/835 |
| 2022/0002636 | A1* | 1/2022 | Man | C11D 1/72 |

FOREIGN PATENT DOCUMENTS

| | | | |
|---|---|---|---|
| CN | 111575121 | B | 6/2021 |
| CN | 113773920 | A | 12/2021 |
| GB | 2597080 | A | 1/2022 |
| WO | 2021152291 | A1 | 8/2021 |

* cited by examiner

CLEANING PRODUCT FOR A CENTRAL HEATING SYSTEM

CROSS-REFERENCE TO RELATED APPLICATIONS

This application is a National Stage of International Application No. PCT/GB2023/050012 filed Jan. 5, 2023, which in turn claims the benefit of GB Patent Application No. 2200169.7, filed Jan. 7, 2022. The entire disclosures of the above applications are incorporated herein by reference.

The present invention relates to a cleaning product, particularly for use in a central heating or cooling system, and to methods of manufacturing the cleaning product and cleaning a central heating or cooling system using the cleaning product.

BACKGROUND TO THE INVENTION

Corrosion, scale and other debris tend to accumulate in radiators and pipework of a central heating system over time. This can impair central heating system performance. Various water-based liquid cleaners containing water-soluble additives are commercially available for dosing into a central heating system to address this issue.

The liquid cleaner is provided in a container such as a bottle or a drum. It can be added into the system via a radiator, using a pressurised can, via a flushing pump, or poured into a filter, for example. In a commercial system, the liquid cleaner may instead be added via a dosing pot installed as part of the central heating system. Once added into the central heating system, the liquid cleaner helps to subsequently flush out the corrosion, scale and other debris that have built up.

Liquid cleaner is usually provided in bottles of 500 ml or 1 litre, although larger volumes from 5 litres to 1000 litres may be provided for commercial use. For example, a liquid cleaner sold under the trade mark Adey MC3+ (RTM) Cleaner has a concentrated formula for cleaning a central heating system.

A typical domestic central heating system may have around 100 to 125 litres of system water. Around 300 ml of liquid cleaner can be used to clean a 125 litre system, using the Adey MC3+ (RTM) Rapide cleaner for example, which corresponds to a dose of around 0.24% v/v. It would be advantageous to provide a more concentrated liquid cleaner to save on packaging and transport costs, which would be more environmentally-friendly. However, at higher concentrations, ingredients of the liquid cleaner would precipitate or crystallise out of solution due to the solubility limit of the liquid.

It should be noted that concentrated liquid cleaner presents a safety risk, particularly in respect of potential contact with the skin or eyes, and appropriate care must be taken during use. If the liquid is spilled, then it must be disposed of appropriately because its chemical constituents can present an environmental hazard.

It is known to provide a cleaner product in the form of a solid, dissolvable tablet. For example, a solid tablet product is known under the trade mark Flamco (RTM) RedProtect Cleaner RP2, and another solid tablet product is known under the trade mark DosaFil (RTM) for commercial systems. However, whilst the risk of spillage is mitigated compared to liquid cleaners, there can be problems with the speed and extent of dissolution of the solid tablet product. Whilst this goes some way to mitigating the safety and environmental issues of liquid cleaners, the tablets have to be protected by plastic packaging which is not always recyclable or easy to recycle, and skin contact with the tablets is still possible.

It is an object of the invention to reduce or substantially obviate the aforementioned problems.

STATEMENT OF INVENTION

According to a first aspect of the present invention, there is provided a cleaning product in the form of a cream or gel for use in a central heating or cooling system, the cleaning product comprising: at least 20% complexing agent (or agents), at least about 2.5% or 5% dispersing agent (or agents), at least about 2.5% or 5% amphoteric surfactant (or surfactants), and less than 20% water. The cleaning product may be encapsulated in a water-soluble film or provided in a container.

This provides a cleaning product which is more highly concentrated than a conventional liquid cleaner for a central heating system. There is a corresponding benefit in terms of reduced packaging and reduced weight for a particular amount of product required to clean a central heating or cooling system. This also minimises the carbon footprint of the product in terms of the energy costs to transport it, and the space required for transporting and storing it.

There may be at least 10% water in the product. That is, there may be in the region of 10% to 20% water in the product. Preferably, there may be up to about 15% water in the product. Some of the ingredients may be dissolved in water or have water content (i.e. provided as aqueous or hydrated starting materials) which can contribute to the water content of the prepared formulation.

By providing a concentrated formulation with less than 20% water, a water-soluble film can remain intact around the cleaning product without dissolving. This makes it easier and significantly safer to handle the product, mitigating the risk of spillage and contact with a person's skin or eyes, for example. Where encapsulated in the film, a number of cream/gel capsules or pods may be provided together in a cardboard box, for example.

In commercial applications for larger system sizes, where significant volumes of product may be required, the more concentrated cleaning product also has correspondingly scaled benefits in terms of transporting, dosing, and handling the product.

In use, the product can be added into a central heating or cooling system via a filter or dosing pot, for example, typically by opening a lid of the filter or dosing pot. If packaged in a water-soluble film, the film will be dissolved by the system water over a period of minutes and release the cleaning product into the system water. Once introduced into the system water, the product quickly disperses compared to a solid tablet-based product, providing immediate protection for the central heating/cooling system without the risk of forming clumps of material which may clog the system.

The ingredients may be provided in the form of a cream or gel (or more generally an emulsion). The cream or gel may be substantially homogenous.

Note that the terms "cream" and "gel" are used roughly synonymously. The product is an emulsion which is low in water content so that it does not dissolve the water-soluble film from the inside. The exact characteristics will depend on the ingredients used, which may vary in different embodiments.

The percentage amounts of the ingredients may be % weight amounts.

A cleaning product in the form of a cream or gel is easier to handle than a liquid cleaner, and readily dissolves and/or disperses into the system water. The concentration of the ingredients in the cream or gel is also higher than possible for a conventional water-based liquid cleaner for a central heating system.

The dosing ratio of the cleaning product of the present invention relative to the capacity of the central heating system may be about 0.2% v/v or less, preferably <0.16% v/V, for example. A total cleaning product volume may therefore be about 250 ml or less, such as 200 ml or less for example.

At least one of the ingredients may be suspended in the cream or gel. For example, the complexing agent may be suspended in the cream/gel, or the dispersing agent may be suspended, or the amphoteric agent may be suspended, or combinations thereof. That is not to say that the entirety of a particular ingredient is suspended, but at least some of it may be depending on the amount of water present and the relative solubility of each ingredient.

The suspended ingredient(s) may be dispersed substantially evenly through the cream or gel. The cream or gel may be thick enough to (or have a viscosity suitable to) keep the suspended ingredient(s) in suspension for the shelf life of the cleaning product. Even if there is settling of the suspended ingredients over enough time, the ingredients are still readily dispersed when the cleaning product is introduced into the system water.

The shelf life of the product may be at least 1 year, or at least 2 years, or preferably at least 3 years. More preferably the shelf life of the product may be between 3 to 5 years. The shelf life may depend on the stability of the product and, where provided in a water-soluble film, the interactions of the product with the film.

Whilst the product is thicker than a conventional liquid cleaner, the viscosity of the cleaning product should not be excessively high. In particular, the flow characteristics of the cleaning product should be suitable for use in a chemical dosing device or system, such as the automated dosing means disclosed in GB2597080.

The water-soluble film may be a polymer film such as a poly(vinyl alcohol) film.

The high concentration of cleaning ingredients and corresponding low water content of the cream/gel means that the film is not dissolved by the cleaning product prior to addition to the system water. Prior art liquid cleaners have contained too much water for this to be possible.

The cleaning product may comprise at least about 40%, 50% or 60% complexing agent, preferably at least about 65% or 70% complexing agent, and more preferably about 75% or 80% complexing agent. In some embodiments, the percentage amount of complexing agent may be up to about 85%. For higher levels of complexing agent in the product, such as around 70% or 80%, the amount of water in the product is preferably around 10% to 15%.

The complexing agent may be provided in solution, such as aqueous solution.

The complexing agent may include one or more organophosphorus compounds. For example, a phosphonate such as sodium phosphonate may be provided. Note that other phosphonates, such as potassium phosphonate, may be provided.

The organophosphorus compound(s) can assist with the breakdown and/or dissolution of metal compounds typically found in heating system debris, such as magnetite and other iron compounds.

The cleaning product may comprise up to about 15% dispersing agent.

The dispersing agent may include one or more organosulfur compounds. For example, a sulfonic acid such as a polymeric sulfonic acid may be provided.

The organosulfur compound(s) can aid dispersal of debris in the central heating or cooling system, in order for debris to be flushed from the system. The debris may be magnetic or non-magnetic.

The cleaning product may comprise up to about 15% amphoteric surfactant.

The amphoteric surfactant may be a low-foaming amphoteric surfactant. That is, an amphoteric surfactant which, when circulated in central heating system water as part of the cleaning product, does not generate significant amounts of foam.

The amphoteric surfactant may include one or more amino acids. For example, an alpha amino acid such as alanine may be provided. Similar amino acids such as glycine are also contemplated for use in the cleaning product.

The cleaning product may comprise corrosion inhibitor. The cleaning product may comprise at least about 2% corrosion inhibitor. The cleaning product may comprise up to about 10% corrosion inhibitor.

The corrosion inhibitor substantially mitigates corrosion of the system by the cleaning product or other corrosion-causing moieties in the system water. Providing the corrosion inhibitor in the cleaning product allows the product to remain in the system for up to 28 days.

The corrosion inhibitor may include one or both of an amine and an azole. The amine may include triethanolamine. The azole may include benzotriazole.

The cleaning product can therefore have a secondary function of minimising corrosion of the pipework and other internal portions of the central heating/cooling system.

In one embodiment, the cleaning product may be a cream/gel which contains 30-80% of organophosphorus compound as a complexing agent, around 5-15% organosulfur compound as a dispersing agent, around 5-15% amphoteric surfactant, around 10-15% water, and 2-10% corrosion inhibitor. This provides a highly concentrated cream or gel cleaning product.

In some embodiments, the cleaning formulation may consist essentially only of complexing agent(s), dispersant(s), surfactant(s), optionally corrosion inhibitor(s), and water.

The cleaning product may include a second solvent, in addition to water. The second solvent may be an organic solvent.

The cleaning product may include a glycol, such as ethylene glycol, diethylene glycol or propylene glycol. This can be suitable for aiding dissolution of some ingredients when preparing the cream/gel. It will be appreciated that another diol, triol or suitable compound comprising multiple hydroxyl groups may be provided alternatively or in addition.

A first group of the ingredients may be provided in a first compartment of the water-soluble film or container. A second group of the ingredients may be provided in a second compartment of the water-soluble film or container. Each group of ingredients may individually comprise less than 20% water.

This may be suitable where a particular combination of ingredients does not form a stable cream/gel with the amount of water used. The ingredients can still separately dissolve or form a cream/gel or other emulsion in less than 20% water, and whilst packaged separately they can still be added to the central heating/cooling system at the same time.

The cleaning product may be used in a central heating system or central cooling system. The cleaning product may be used in other circulation systems where there is metal pipework or conduits, particularly where the pipework/conduits convey water.

According to a second aspect of the invention, there is provided a method of manufacturing a cleaning product for a central heating or cooling system, the method comprising the steps of mixing ingredients including a complexing agent, a dispersing agent, and an amphoteric surfactant into a quantity of water, forming a cream or gel comprising at least 20% complexing agent, at least 2.5% or 5% dispersing agent, at least 2.5% or 5% amphoteric surfactant, and less than 20% water.

The advantages are substantially similar to those presented for the first aspect of the invention. Any feature or features presented with respect to the first aspect of the invention may be provided in the method.

The method may further comprise the step of encapsulating the cream or gel in a water-soluble film.

As the cream/gel forms, at least one of the ingredients may be suspended or become suspended in the cream or gel. One or more of the ingredients may be powdered, and may be suspended in the cream or gel.

The ingredients may be mixed together as a single phase solution. The solution may be thickened e.g. by adding a viscosity modifier (or thickening agent) or by evaporating water, to thicken the solution. Any suitable thickening agent may be used, if suitably compatible with the other ingredients. It will be appreciated that the solution may be thickened by other means and it is not essential to add a viscosity modifier. Once thickened, the cream or gel may form.

A first group of the ingredients may be mixed into a first quantity of the water to form a first cleaning product component. A second group of the ingredients may be mixed into a second quantity of the water to form a second cleaning product component.

The first and second cleaning product components may be encapsulated in a water-soluble film in respective first and second compartments of that film, or in separate (or discrete) water-soluble films.

For example, a kit of parts for a cleaning product may include one or more first capsules/units of water-soluble film containing the first cleaning product component, and one or more second capsules/units of water-soluble film containing the second cleaning product component. Each capsule or pod may then be added to the system water.

According to a third aspect of the invention, there is provided a kit of cleaning product for use in a central heating or cooling system, the kit comprising a first cleaning product component in a first container (such as water-soluble film) and a second cleaning product component in a second container (such as water-soluble film), in which the first and second cleaning product components together comprise at least 20% complexing agent, at least 2.5% or 5% dispersing agent, at least 2.5% or 5% amphoteric surfactant, and optionally corrosion inhibitor, and in which the first and second cleaning product components each independently comprise less than 20% water.

The kit may include any feature or features presented with respect to other aspects of the invention. The cleaning product components may each include any subset of the ingredients, such that together they provide the required combination of cleaning product ingredients.

According to a fourth aspect of the invention, there is provided a method of cleaning a central heating or cooling system, the method comprising introducing a cleaning product of the first aspect of the invention, or made by the method of the second aspect of the invention, into fluid of the central heating or cooling system.

After a period of time has elapsed for the cleaning product to circulate and take effect, the cleaning product may be flushed out of the central heating or cooling system. This is typically followed by filling the central heating system with a new quantity of water which does not contain the cleaning product.

BRIEF DESCRIPTION OF THE DRAWINGS

For a better understanding of the present invention, and to show more clearly how it may be carried into effect, reference will now be made by way of example only to the accompanying drawings, in which.

DESCRIPTION OF PREFERRED EMBODIMENTS

Figure 1:
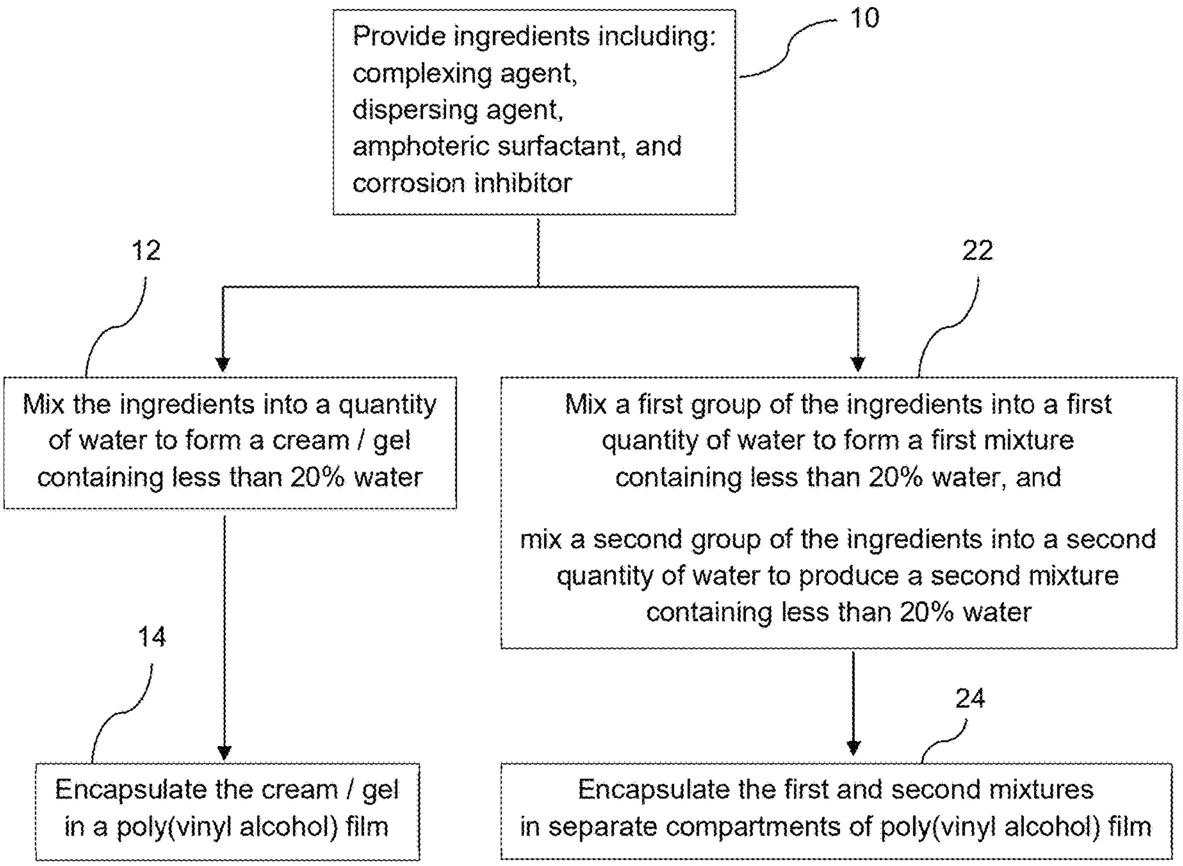
FIG. 1 is a flow chart illustrating methods according to the second aspect of the invention.

FIG. 1 shows two different ways of making a cleaning product for use in cleaning a central heating system or central cooling system.

In the first way of making formulation for the cleaning product, the first step 10 is to provide ingredients including the complexing agent, dispersing agent, amphoteric surfactant, and optionally corrosion inhibitor. These ingredients can be mixed together in a quantity of water to provide a cleaning formulation in a second step 12, and encapsulated in water-soluble film such as poly(vinyl alcohol) film in a third step 14.

The complexing agent may include sodium phosphonate, for example, although other phosphonates and organophosphorus compounds may be suitable as complexing agents for metal ions and/or compounds in a central heating/cooling system. The complexing agent may be a powder, such as anhydrous powder. The relative amount of complexing agent may be about 20% to 40% of the final cleaning product. For example, for 100 g of cream/gel, the amount of complexing agent may be 20 g to 40 g. However, in some embodiments, up to about 80% or 85% complexing agent may be provided.

The dispersing agent may include polymeric sulfonic acid, for example, although other sulfonic acids and organosulfur compounds may be suitable as dispersing agents for breaking down or dissolving debris such as metal compounds or ions in a central heating/cooling system. The dispersing agent may be a solid or powder, such as an anhydrous solid or powder. The relative amount of dispersing agent should be about 5% to 15% of the final cleaning product. For 100 g of cream/gel, the amount of complexing agent would be 5 g to 15 g.

The amphoteric surfactant may include alanine, for example, although other amino acids or low-foaming amphoteric surfactants may be suitable for use in the cleaning product. The surfactant may be a powder, such as anhydrous powder. The relative amount of amphoteric surfactant should be about 5% to 15% of the final cleaning product. For 100 g of cream/gel, the amount of amphoteric surfactant would be 5 g to 15 g.

The corrosion inhibitor may include benzotriazole and triethanolamine, for example, although other suitable corrosion inhibitors may be provided instead of or in addition to those compounds. The relative amount of corrosion inhibitor compounds should total about 2% to 10% of the final cleaning product. For 100 g of cream/gel, the amount of amphoteric surfactant would be 2 g to 10 g.

For preparing 100 g of cream/gel, the mixing step 12 involves mixing the ingredients into less than 20 g of water when using the amounts of ingredients noted above. For example, the amount of water may be 10 g to 15 g. The water may be heated (whilst remaining liquid) to maximise the extent to which it can dissolve the ingredients, for example at around 50° C. The mixing may involve stirring in a reaction vessel.

In some embodiments the ingredients may be mixed in sequentially, or altogether at the same time in other embodiments. It may sometimes be preferable to dissolve the minor ingredients into the water first. For example, the corrosion inhibitor, the amphoteric surfactant and/or the dispersing agent may be mixed into the water first, followed by the complexing agent. Mixing in the major ingredient, i.e. the complexing agent, may then form the cream/gel product with some ingredient being suspended in the cream/gel that forms. Ingredient that becomes suspended may include precipitate from solution and/or ingredient which was not previously dissolved in the water.

In some embodiments, the order in which ingredients are added may be dependent on the solubility of a given ingredient in the cream/gel. That is, one ingredient which does not tend to dissolve into the cream/gel as well as the other ingredients may be added last. For example, a liquid mixture may be prepared comprising all but one of the ingredients. Once done, the last ingredient (which may be in the form of a powder) may be added. This may thicken the mixture and suspend the powder homogenously in the cream/gel to give a single cleaning product formulation.

Where the mixture has been heated, it may be cooled or allowed to cool. The cream/gel formed following the mixing step can be encapsulated in water-soluble film in step 14, such as poly(vinyl alcohol) film, which is so far unknown for a central heating system cleaner. The relatively low water content of the cream/gel means that the cleaning product 130 can be provided in a single compartment of the film, without dissolving the cream/gel dissolving the film. The cream/gel is stable for storage at room temperature in the water-soluble film over an extended period of time.

The cream/gel has a significantly higher relative concentration of cleaning chemicals, and a significantly lower relative concentration of water, compared to prior art cleaning formulations for a central heating system.

The cream or gel may be concentrated enough that a suitable dose for a typical domestic central heating system is about 200 ml, for example. The volume of cream/gel in a given capsule or pod of the product may be less than this, in which case multiple capsules/pods can be used for treating the system. The number of capsules required can be scaled according to the size of the central heating system, and optionally the amount of time since it was previously cleaned.

In the second way of making formulation for the cleaning product, the ingredients are again provided in the first step 10. However, they are then divided into two groups of ingredients. The groups are mixed 22 into separate quantities of water to prepare first and second cleaning product compositions, which are encapsulated 24 in separate compartments of water-soluble film. Either or both of the first and second compositions may be a cream or gel. The separate compartments may be part of completely different capsules/films, or may be discrete compartments within different parts of the same capsule/film.

For example, a first group of the ingredients may include the amphoteric surfactant, the corrosion inhibitor(s) and the dispersing agent, whilst the second group of ingredients may include the complexing agent. In another example, the first group of the ingredients may include the amphoteric surfactant, the corrosion inhibitor(s), the dispersing agent and some of the complexing agent, whilst the second group may include the remainder of the complexing agent. It will be appreciated that the groups may each be selected to independently include any combination of the ingredients.

The amount of water used for mixing with each group of ingredients should be less than 20% of the total weight/volume of that group, to mitigate dissolution of the film by the cleaning product composition.

Whilst providing the cleaning product in a single compartment may be a comparatively more economical route to providing the cleaning product, mixing two groups of the ingredients into respective first and second quantities of water can be useful where the ingredients are somewhat incompatible for forming a cream or gel when mixed together.

Figure 2:
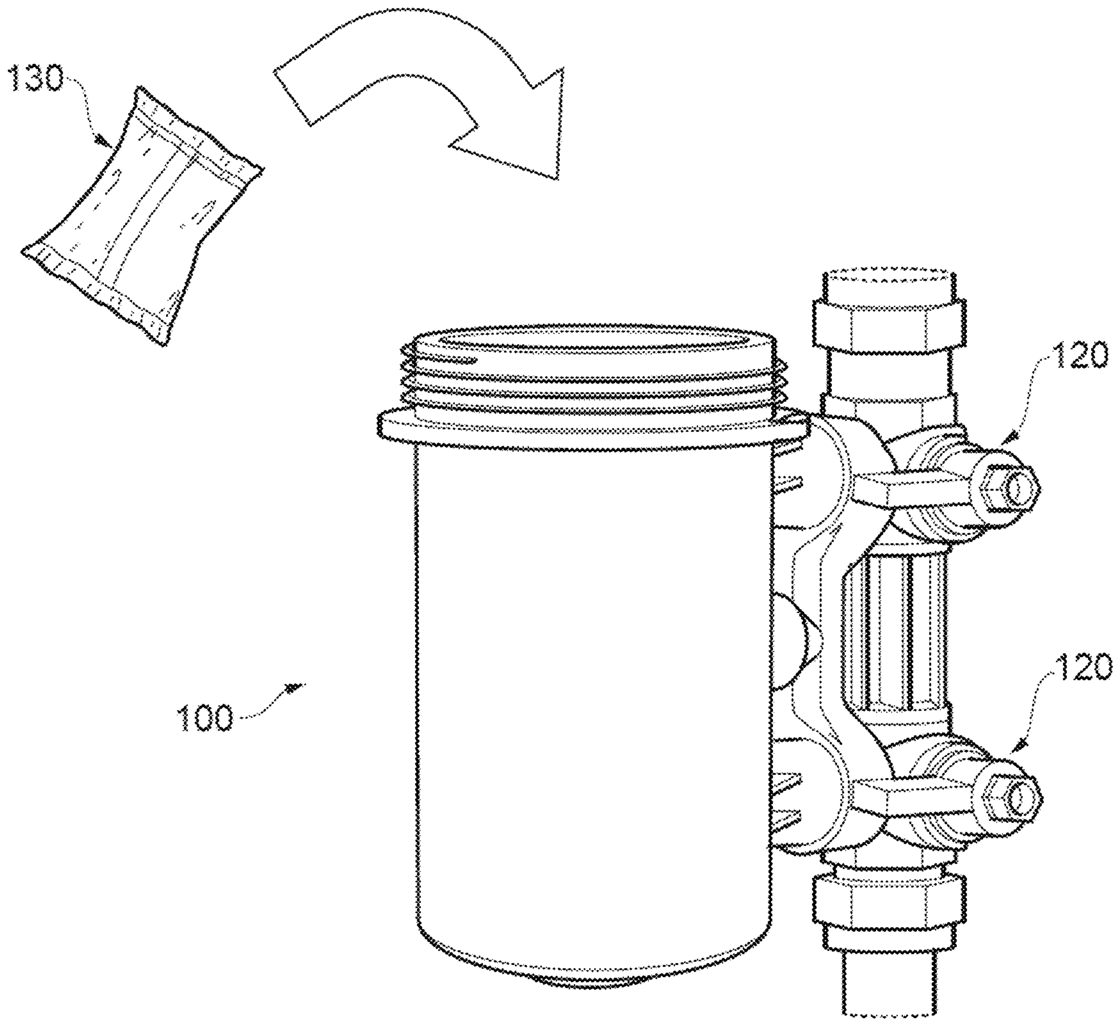
FIG. 2 shows a cleaning product according to the first or third aspect of the invention being used to protect a central heating system according to the method of the fourth aspect of the invention.

FIG. 2 shows a cleaning product 130 where the ingredients are provided in a water-soluble film. In some embodiments, two products 130 may be provided as a kit, together containing the ingredients of the cleaning product. A filter 100 is connected to a central heating system (not shown) by means of inlet and outlet valves 120.

In order to clean the central heating system, the filter 100 has first been isolated from the system by shutting valves 120. The filter lid (not shown) has also been removed. The cleaning product 130 is then added into the filter 100 via the open end. The lid can then be secured to the filter 100 and the valves 120 opened. It will be appreciated that the number of products 130 added to the filter may vary according to the amount of product required to dose the particular size of system being cleaned. The number of products 130 used is normally less than the internal volume of the filter, leaving room for a magnet attached to the lid to fit into the filter when the lid is secured to it.

The film of the cleaning product 130 dissolves in the central heating system water over a short time, typically on the order of minutes. This releases the cleaning product cream/gel, which dissolves or disperses into the system water. Where the cream/gel includes a suspended ingredient or ingredients, those ingredients can also dissolve or disperse into the system water. The ingredients provide a cleaning action by dislodging debris and unwanted contaminants (particularly metals and their compounds) within the central heating system pipework and radiators.

The ingredients are circulated within the central heating system for a period of time to allow the cleaning action to occur. This may take a minimum of around an hour, for example, although the amount of time required will to some extent depend on the size of the system and how long it has been since it was last cleaned (i.e. how dirty/clogged the system is). In some cases, the cleaning product may be left in for a period of days or a few weeks (up to 28 days), for example. Corrosion inhibitor should be provided to mitigate corrosion to the central heating/cooling system during that time.

Once the cleaning product has been circulated for long enough, the system can be drained and flushed through with fresh water. The system is then re-filled as usual. This may include dosing the re-filled system water with a suitable amount of corrosion inhibitor.

The embodiments described above are provided by way of example only, and various changes and modifications will be apparent to persons skilled in the art without departing from the scope of the present invention as defined by the appended claims.

The invention claimed is:

1. A cleaning product for use in a central heating or cooling system, the cleaning product comprising:

at least 20 wt. % complexing agent, at least 5 wt. % dispersing agent, at least 5 wt. % amphoteric surfactant, and less than 20 wt. % water, in which the cleaning product is in the form of a cream or gel.

2. A cleaning product as claimed in claim 1, comprising corrosion inhibitor.

3. A cleaning product as claimed in claim 1, in which the cream or gel is encapsulated in a water-soluble film or provided in a container.

4. A cleaning product as claimed in claim 1, in which at least one of the complexing agent, dispersing agent and amphoteric surfactant is suspended in the cream or gel.

5. A cleaning product as claimed in claim 1, comprising 60 wt. % to 85 wt. % complexing agent.

6. A cleaning product as claimed in claim 1, comprising at least 40 wt. % complexing agent, in which the complexing agent includes at least one of the following:

one or more organophosphorus compounds;

a phosphonate; and sodium phosphonate.

7. A cleaning product as claimed in claim 1, comprising up to 15 wt. % dispersing agent, in which the dispersing agent includes at least one of the following:

one or more organosulfur compounds;

a sulfonic acid; and a polymeric sulfonic acid.

8. A cleaning product as claimed in claim 1, comprising up to 15 wt. % amphoteric surfactant, in which at least one of the following is provided:

the amphoteric surfactant is a low-foaming amphoteric surfactant;

the amphoteric surfactant includes one or more amino acids; and the amphoteric surfactant is an alpha amino acid or alanine.

9. A cleaning product as claimed in claim 2, comprising up to 10 wt. % corrosion inhibitor, in which the corrosion inhibitor includes one or both of:

one or both of an amine and an azole; and one or both of triethanolamine and benzotriazole.

10. A cleaning product as claimed in claim 3, in which a first group of the cleaning product ingredients is provided in a first compartment of the water-soluble film or container, and a second group of the cleaning product ingredients is provided in a second compartment of the water-soluble film or container, and each group of ingredients comprises less than 20 wt. % water.

11. A cleaning product as claimed in claim 1, in which the cream or gel comprises at least 40 wt. % complexing agent, 5 wt. % to 15 wt. % dispersing agent, 5 wt. % to 15 wt. % amphoteric surfactant, less than 20 wt. % water, and 2 wt. % to 10 wt. % corrosion inhibitor.

12. A cleaning product kit for use in a central heating or cooling system, the kit comprising a first cleaning product component in a first container and a second cleaning product component in a second container, in which the first and second cleaning product components together comprise at least 20 wt. % complexing agent, at least 5 wt. % dispersing agent, and at least 5% amphoteric surfactant, in which the first and second cleaning product components each independently comprise less than 20 wt. % water.

13. A cleaning product kit as claimed in claim 12, in which one or both of the first and second cleaning product components comprise corrosion inhibitor.

14. A method of manufacturing a cream or gel which is a cleaning product for a central heating or cooling system, the method comprising the steps of mixing ingredients including a complexing agent, a dispersing agent, an amphoteric surfactant and a quantity of water, and from the mixture forming a cream or gel comprising at least 20 wt. % complexing agent, at least 5 wt. % dispersing agent, at least 5 wt. % amphoteric surfactant, and less than 20 wt. % water.

15. A method as claimed in claim 14, further comprising the step of encapsulating the cream or gel in a water-soluble film.

16. A method as claimed in claim 14, including mixing corrosion inhibitor into the mixture, in which the cream or gel comprises at least 40 wt. % complexing agent, 5 wt. % to 15 wt. % dispersing agent, 5 wt. % to 15 wt. % amphoteric surfactant, less than 20 wt. % water, and 2 wt. % to 10 wt. % corrosion inhibitor.

17. A method as claimed in claim 14, in which a first group of the cleaning product ingredients are mixed into a first quantity of the water to form a first cleaning product component, and a second group of the cleaning product ingredients are mixed into a second quantity of the water to form a second cleaning product component, and the first and second cleaning product components are encapsulated in water-soluble film in respective first and second compartments.

18. A method of cleaning a central heating or cooling system, the method comprising introducing a cleaning product as claimed in claim 1.

19. A method as claimed in claim 18, in which, after a period of time has elapsed for the cleaning product to circulate and take effect, the cleaning product is flushed out of the central heating or cooling system.

20. A method of cleaning a central heating or cooling system, the method comprising introducing a kit as claimed in claim 12 into fluid of the central heating or cooling system, and in which after a period of time has elapsed for the kit to circulate and take effect, the kit is flushed out of the central heating or cooling system.

* * * * *